US006510032B1

(12) United States Patent
Whitney

(10) Patent No.: US 6,510,032 B1
(45) Date of Patent: Jan. 21, 2003

(54) INTEGRATED OVERCURRENT AND OVERVOLTAGE APPARATUS FOR USE IN THE PROTECTION OF TELECOMMUNICATION CIRCUITS

(75) Inventor: Stephen J. Whitney, Lake Zurich, IL (US)

(73) Assignee: Littelfuse, Inc., Des Plaines, IL (US)

( * ) Notice: Subject to any disclaimer, the term of this patent is extended or adjusted under 35 U.S.C. 154(b) by 0 days.

(21) Appl. No.: 09/534,277

(22) Filed: Mar. 24, 2000

(51) Int. Cl.[7] .......... H02H 3/22

(52) U.S. Cl. .......... 361/111; 361/119

(58) Field of Search .......... 361/119, 117–118, 361/111, 124–127, 91.1, 91.5, 91.8, 93.1, 93.8, 104; 337/404, 28, 31, 34

(56) References Cited

U.S. PATENT DOCUMENTS

| | | | | |
|---|---|---|---|---|
| 4,467,308 A | | 8/1984 | Arikawa et al. | |
| 4,912,589 A | | 3/1990 | Stolarczyk | 361/56 |
| 4,920,327 A | | 4/1990 | Arikawa et al. | |
| 5,198,791 A | * | 3/1993 | Shibayama et al. | 337/31 |
| 5,214,406 A | | 5/1993 | Reese et al. | |
| 5,377,067 A | * | 12/1994 | Tanaka et al. | 361/104 |
| 5,408,379 A | * | 4/1995 | Oguchi et al. | 361/55 |
| 5,425,099 A | | 6/1995 | Takakura et al. | 379/413 |
| 5,699,032 A | | 12/1997 | Ulm, Jr. et al. | |
| 5,712,610 A | * | 1/1998 | Takeichi et al. | 337/290 |
| 5,977,860 A | | 11/1999 | Ulm, Jr. et al. | |
| 6,067,216 A | * | 5/2000 | Groger | 361/56 |
| 6,285,535 B1 | * | 9/2001 | Nakamura | 361/56 |

OTHER PUBLICATIONS

Harris Surgectors for Telecommunications System—pp. 10–149/10–156, (No date).

* cited by examiner

*Primary Examiner*—Ronald W. Leja
(74) *Attorney, Agent, or Firm*—Bell, Boyd & Lloyd LLC

(57) ABSTRACT

The present invention provides an integrated overvoltage and overcurrent circuit protection device for use in telecommunication circuits. The integrated protected circuit device combines an overcurrent device and a fuse and an overvoltage protection device such as a thyristor to respectively protect against overcurrent conditions and transient overvoltages. Integration of the two devices in a common package ensures proper coordination and matching of the components, reduces the final product cost and reduces the physical space required on a telecommunications circuit for overvoltage and overcurrent circuit protection.

33 Claims, 2 Drawing Sheets

INTEGRATED OVERCURRENT AND OVERVOLTAGE APPARATUS FOR USE IN THE PROTECTION OF TELECOMMUNICATION CIRCUITS

BACKGROUND OF THE INVENTION

The present invention relates to overvoltage and overcurrent protection apparatus for telecommunication circuitry and method of manufacturing same. In particular, the invention relates to fuses and thyristors.

Circuitry, particularly sensitive circuitry such as that found in telecommunication systems, require protection against both overcurrent and overvoltage conditions that may arise. Conditions such as short circuits may arise requiring an overcurrent protection device, such as a fuse, in order to prevent damage to circuitry.

Lightning is a common source of overvoltage in communication systems. Typically, communication systems consist of conductors in shielded cables suspended on poles or buried in the earth. The cable is made up of many conductors arranged in twisted pairs, commonly known as "Tip" and "Ring" lines for telephone systems, in particular. These cables are susceptible to transient energy from lightning and may conduct energy from the lightning to either a central office or subscriber equipment. Additionally, power sources for telecommunication systems are usually obtained from commercial power lines, which are also subject to excess energy from lightning that can, in turn, induce overvoltages in the telecommunication system being supplied by the power line.

Common approaches in the art to mitigate overcurrents and overvoltages include a combination of a fuse and a semiconductor overvoltage device such as a bi-directional thyristor, as shown in the circuit of FIG. 1. A fuse 100 is placed in series with a copper twisted pair 102 either in the Tip line 104 or in the Ring line 106. Hence, the fuse 100 protects the tip and ring wiring and also a bidirectional thyristor 110 from excessive energy in the event a continuous overvoltage is coupled to the wiring, as might occur if a power line falls across the wiring.

In order to limit overvoltage conditions, an overvoltage device such as the bi-directional thyristor 110 is connected across the twisted pair 102 in parallel with the telecommunication system 108. The thyristor 110 provides bidirectional "crow-bar" clamping of transients that may occur for either polarity. In particular, the thyristor 110 has a breakdown voltage at which a transient voltage exceeding this value will cause the thyristor 110 to begin clamping action across the lines 104 and 106. As the transient voltage attempts to rise higher, the current through the thyristor 110 will increase until a break-over voltage is reached. At this point, thyristor action is triggered and the thyristor 110 switches to its "on" or "latched" state. This is a very low impedance state that shunts or "crow-bars" the line, thereby suppressing the magnitude of the transient voltage. When the transient voltage diminishes, the thyristor 110 turns off and reverts to a high impedance "off" state.

The circuit of FIG. 1 is commonly used to protect "Tip" and "Ring" connections such as modems, telephones, facsimile machines, and line cards. While the circuit of are also suitable for circuits sought to be protected such as alarm circuits, power supplies, remote sensors, CATV, data lines, etc.

The protection circuits used in telecommunication applications, such as that shown in FIG. 1, commonly utilize discretely packaged fuse and thyristor components connected in printed circuit wiring. The discrete component approach, however, requires that the components be properly coordinated and matched with one another in order to meet pertinent regulatory and safety agency requirements. Also, the discretely packaged components are typically sourced separately, thus adding increased cost to the final product. Furthermore, using discrete components consumes considerable physical space on a printed circuit since two separate component packages must be placed on the printed circuit.

SUMMARY OF THE INVENTION

There is a need for an improved circuit device that achieves both overcurrent and overvoltage protection in a discrete integral package to more easily assure coordination and matching of the overcurrent and overvoltage devices. In addition, there is a need for a discrete integral package approach that affords lower final product cost and reduces the physical space consumed in a printed circuit.

These and other advantages are provided by the present invention, where overcurrent and overvoltage protection devices are packaged in a common housing to form a single discrete circuit element that is substantially no larger than one of the overcurrent or overvoltage devices that are each discretely packaged as previously known in the art, such as a standard surface mount telecommunications fuse, for example.

In an embodiment, the present invention provides an integral circuit protection device providing overcurrent and overvoltage protection for a circuit that is configured to be connected to the circuit. The device includes an overcurrent protection portion, an overvoltage protection portion, and a plurality of terminals for connecting both the overvoltage and overcurrent protection portions of the integral circuit device to the circuit to be protected. Incorporation of both overvoltage and overcurrent devices into a single housing assures that these components are coordinated and matched for a particular application, lowers the total cost of the device since the components are not sourced separately and allows for smaller size by incorporating the devices into the same package.

In another embodiment the plurality of terminals includes first, second and third terminals with the overcurrent protection portion electrically connected between the first and second terminals and the overvoltage protection portion connected between the second and third terminals.

In another embodiment, the overcurrent protection portion includes a fuse.

In another embodiment, the overvoltage protection portion includes a bi-directional thyristor.

In another embodiment, the plurality of terminals of the integral circuit are configured to electrically connect the overcurrent protection portion in series with the circuit to be protected and to electrically connect the overvoltage protection portion in parallel with the circuit to be protected when the integral circuit device is electrically connected to the circuit to be protected.

In yet another embodiment, the integral circuit further includes a thermally conductive portion that conducts heat away from the overvoltage protection portion.

In an embodiment, thermal coefficients of the thermally conductive portion and overvoltage protection portion are substantially the same.

In an embodiment, the overvoltage protection portion is at least partially encapsulated with an atmospherically resistant material.

In another embodiment, the integral circuit device is configured for mounting on a printed circuit board.

In another embodiment, the integral circuit device is configured substantially the same as a standard telecommunications fuse configuration.

In yet another embodiment of the present invention, a circuit element is provided for overvoltage and overcurrent protection of a circuit. The circuit element includes a circuit element housing having first, second and third terminals. An overcurrent protection device is electrically connected between the first and second terminals and contained by the circuit element housing. In addition, an overvoltage protection device is electrically connected between the second and third terminals and also contained by the circuit element housing.

In an embodiment, the circuit element housing is comprised of a tube having an outer surface, an inner hollow portion, a first end and a second end. The overcurrent protection device is disposed within the inner hollow portion of the tube, the overvoltage protection device and the second terminal are disposed on the outer surface of the tube, the first terminal is disposed at the first end and the second terminal is disposed at the second end opposite from the first terminal.

In another embodiment, the first and second terminals include electrically conductive layers disposed on the outer surface of the tube adjacent to each of the first and second ends and extending into part of the inner hollow portion adjacent to the first and second ends. Additionally, conductive end caps respectively cover the electrically conductive layers and the first and second ends and are electrically connected to the electrically conductive layers.. The electrically conductive layers are also electrically connected to the overcurrent device disposed within the inner hollow portion of the tube.

In yet another embodiment, the third terminal is comprised of a conductive terminal disposed on the outer surface of the tube.

In another embodiment, a die bond pad is disposed on the outer surface of the tube. A bond pad conductor is also disposed on the outer surface of the tube and electrically connected to at least one of the first and second conductive layers. A first conductor electrically connects the bond pad conductor to the die bond pad and a second conductor electrically connects the third terminal to the die bond pad. A thyristor is disposed on the die bond pad and covered with an encapsulant material.

In an embodiment, the encapsulant material is atmospherically resistant and disposed such that the thyristor and the die bond pad on the outer surface of the tube are sealed to resist surrounding atmosphere.

In another embodiment, the thyristor disposed on the die bond pad is bonded to the die bond pad by a thermally conductive bonding material.

In an embodiment, the circuit element housing includes a substrate having first and second surfaces and a plurality of wire terminations disposed on at least one of the first and second surfaces, wherein the first, second and third terminals are each respectively comprised of one of the plurality of wire terminations.

In an embodiment, the overcurrent device is comprised of a fuse element electrically connected between the first and second terminals and disposed on at least one side of the substrate. The overvoltage device is comprised of a thyristor electrically connected between the second and third terminal and disposed on at least one side of the substrate.

In a further embodiment of the present invention, a circuit element is provided for overvoltage and overcurrent protection for circuitry in a telecommunications system. The circuit element includes a fuse element, a semiconductor overvoltage protection device, and a package configured as a discrete component that is mountable on a printed circuit board, the package containing the fuse element and the semiconductor overvoltage protection device.

In another embodiment, the package includes first, second and third terminals. In addition, the fuse element and the semiconductor overvoltage protection device both include corresponding first and second lead connections. The first terminal is connected to the first lead connection of the fuse element, the second terminal is connected to the second lead connection of the fuse element and the first lead connection of the semiconductor overvoltage protection device and the third terminal is connected to the second lead connection of the semiconductor overvoltage protection device.

In a still further embodiment of the present invention, the invention provides a method for providing an overcurrent and overvoltage device in a telecommunications circuit. The method includes providing a housing configured to receive an overcurrent protection element and an overvoltage protection element, the housing having a plurality of terminals. The overcurrent and overvoltage protection elements are disposed within the housing such that the overcurrent protection element is electrically connected between first and second terminals of the plurality of terminals and the overvoltage protection element is electrically connected between the second terminal and a third terminal of the plurality of terminals. Finally, the housing is connected as a single discrete element to a circuit board that includes the telecommunications circuit.

In an embodiment, the method includes electrically connecting one of the first and second terminals to a first incoming line to the telecommunications circuit and electrically connecting the other of the first and second terminals to the telecommunications circuit such that the overcurrent protection element is connected in series with the telecommunications circuit, and electrically connecting the third terminal to a second incoming line to the telecommunications circuit such that the overvoltage protection element is connected in parallel with the telecommunications circuit.

Additional advantages and features of the present invention will become apparent upon reading the following detailed description of the presently preferred embodiments and appended claims, and upon reference to the attached drawings.

BRIEF DESCRIPTION OF THE FIGURES

Reference is made to the attached drawings, wherein elements having the same reference numeral represent like elements throughout and wherein.

DETAILED DESCRIPTION OF THE PRESENTLY PREFERRED EMBODIMENTS

The present invention provides a single discrete component that includes an overcurrent protection element and an overvoltage protection element enclosed by a common housing. Additionally the present invention provides methods of manufacturing same.

Figure 1:
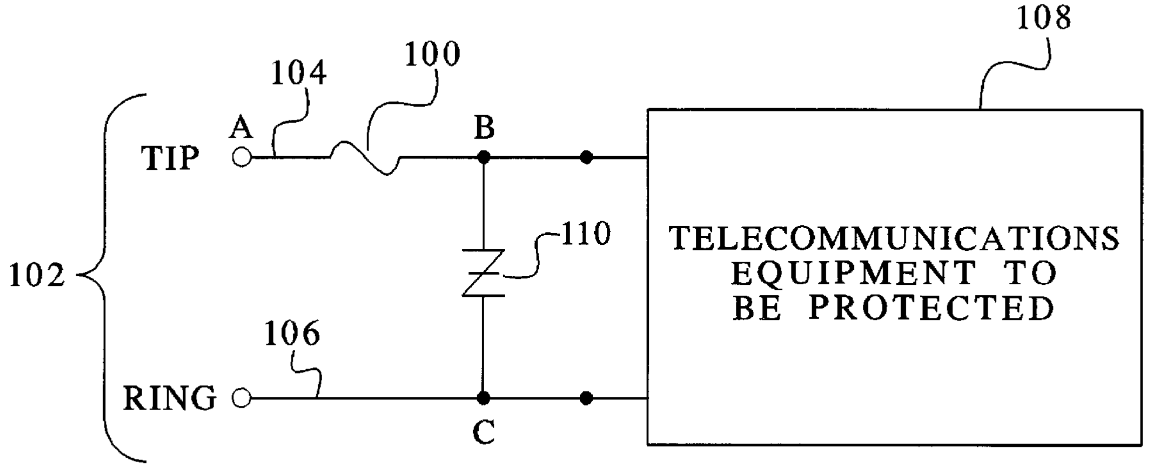
FIG.1 (PRIOR ART)
FIG. 1 is a schematic illustrating circuit connections for a conventional circuit protecting against overcurrent and overvoltage for telecommunication equipment.
Figure 2:
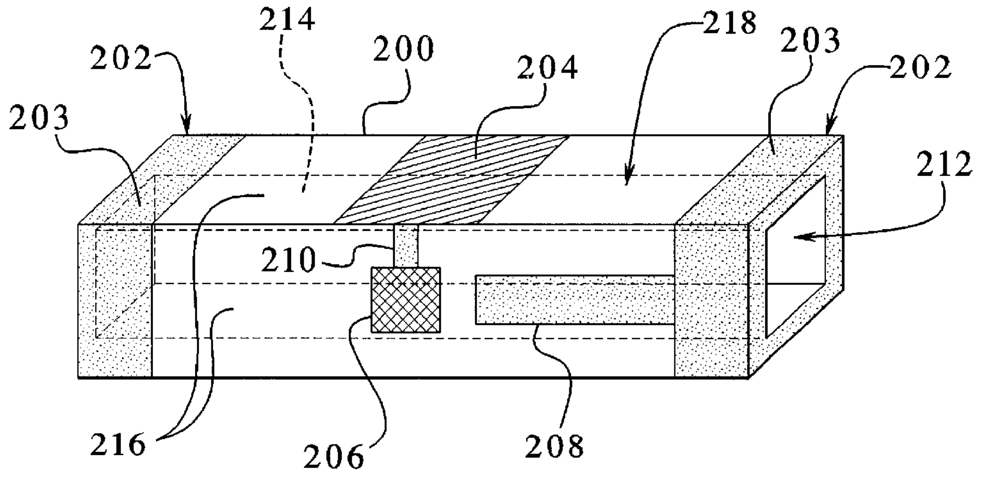
FIGS. 2–4 illustrate the construction steps for an integral overcurrent and overvoltage circuit element according to an embodiment of the present invention.
Figure 3:
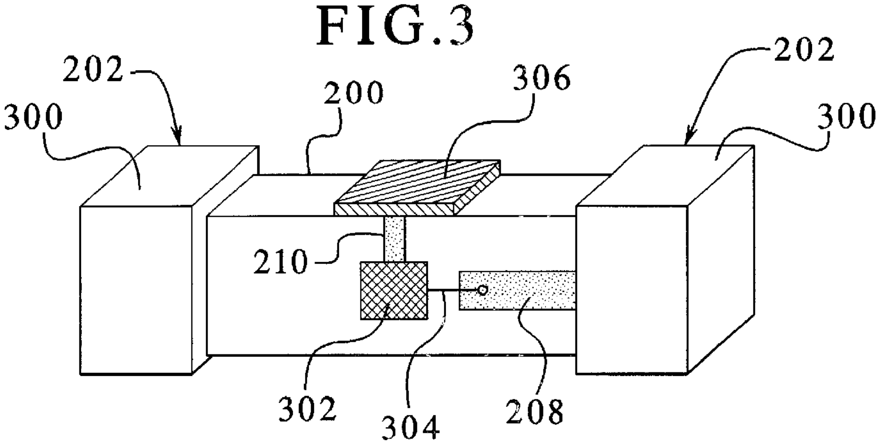
Figure 4:
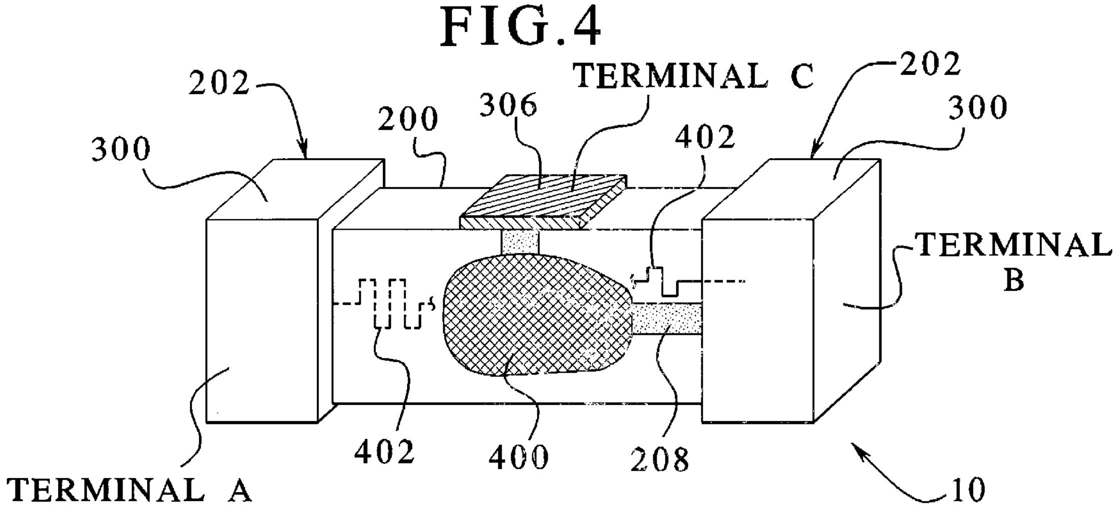

Referring now to the drawings, FIGS. 2–4 illustrate the construction of an overcurrent and overvoltage protection device 10 (shown in finished form in FIG. 4) according to an embodiment of the present invention that integrates fuse and thyristor components shown in FIG. 1 into a single, discrete circuit element. Hence, the circuit element shown in FIG. 4 has the same circuit arrangement as shown in FIG. 1, but includes both a fuse device and a semiconductor overvoltage device, preferably a bidirectional thyristor, in a common package.

As shown in FIG. 2, the circuit element is constructed of a tube 200 that is preferably hollow as indicated by hole 212. The hollow space 214 inside the tube accommodates a fuse element. The tube 200 is constructed of a material that is thermally conductive such as ceramic, for example, in order to dissipate heat energy released by a fuse element within the tube or a semiconductor thyristor element that is placed on an outer surface 216 of the tube. Each end 202 of the tube 200 may include a surface metalization 203 that is disposed on the outer surface 216 of the tube end 202 and may extend around the end portions 202 into the inner hollow portion 214 of the tube 200. These metalizations 203 are used for electrically connecting terminals of a fuse element that is located within the inner hollow portion of the tube.

FIG. 2 also illustrates a die bond pad 206 that is disposed on the outer surface 216 of the tube 200. This die bond pad 206 is preferably a metalization that is used for bonding a thyristor to be placed on the outer surface 216 of the tube 200. This die bond pad 206 may be disposed on the tube 200 by various known methods such as screen printing, chemical vapor deposit or radio frequency sputter. Additionally, a bond pad 208 is similarly disposed on the outer surface 216 of the tube 200, preferably on the same surface of a square tube as shown in FIGS. 2–4 as the die bond pad 206. The bond pad 208 is disposed so as to electrically contact the metalization 203 at least at one end of the tube 200. Tube 200 also includes a metalization 204 that will be used for placing a common terminal corresponding to terminal “C” as shown in FIG. 1. In a preferred embodiment, the metalization 204 is placed on a side 218 of the tube 200 different from the die bond pad 206 and the bond pad conductor 208 due to space considerations. However, the metalization 204 can be placed on sides other than side 218. That is, in order to minimize the longitudinal length of the tube 200, it is preferable to utilize more than one side or surface of the tube 200 to place terminals and components. A metalization conductor 210 is included to electrically connect the die bond pad 206 to the metalization 204 that will later become a common terminal.

FIG. 3 illustrates the next step in construction of the circuit element of the present invention. Specifically, end caps 300, which facilitate connection of the circuit element to a printed circuit board in the telecommunications equipment being protected, are located on each end 202 of the tube 200 and electrically connect to the metalization 203 on each end of the tube 200 that, in turn, are connected to the two ends of the fuse element within the inner hollow portion 214 of the tube 200. In an alternate embodiment, metallization 203 may be omitted, in which case the end caps 300 connect directly with the fuse element and metallization 208.

FIG. 3 also illustrates the placement of a thyristor device 302 on the die bond pad 206. The thyristor 302 is bonded to the die bond pad 206 by methods commonly known in the art to provide thermal and electrical conductivity between the component and bond pad. Examples of such methods include soldering or affixing with conductive epoxy. Irrespective of the affixing type, the bonding method utilized must provide thermal and electrical conductivity between the thyristor and the bond pad that, in turn, thermally conducts with the tube 200 and electrically conducts to pad 206. This thermal conductivity allows heat energy generated during an overvoltage condition that causes current to flow in the thyristor to be dissipated by and throughout the tube 200. Dissipating heat from the thyristor 302 reduces the risk of damage to the thyristor 302 from heat energy released during its operation under overvoltage conditions.

Preferably, the thyristor 302 is constructed with a vertical structure that it is substantially flat having a cathode on one surface and an anode on the opposing surface. Accordingly, when the thyristor 302 is placed on the die bond pad 206, one of the cathode or anode is in electrical contact with the die bond pad 206 and the other opposing thyristor terminal (i.e., either the anode or cathode) faces away from the tube 200. Hence, connection with the opposing terminal to the bond pad 208 requires either a bond wire or a bond strap 304.

Finally, FIG. 3 illustrates that a metal terminal 306 is disposed on the metalization 204 shown in FIG. 2, to form a common terminal corresponding to terminal C shown in FIG. 1.

FIG. 4 illustrates the finished circuit element including a fuse element 402 within the inner portion of the tube 200 and indicated by dashed lines to delineate its position within the tube 200. The fuse element 402 is connected between terminal A and terminal B, these terminals, in turn, being used to connect the fuse between the Tip line of a twisted pair and the telecommunications equipment being protected (i.e., 108 in FIG. 1). Furthermore, the bi-directional thyristor 302 is connected between terminals B and C via bond pad 208, bond wire 304, conductor 210 and metal terminal 306 (i.e., Terminal C). Hence, the bidirectional thyristor 302 can be connected in parallel with the telecommunications equipment 108 by connecting terminal B to the Tip line entering the equipment, terminal C, and the Ring line.

Additionally, FIG. 4 illustrates that the bi-directional thyristor 302 and bond wire or strap 304 are encapsulated by an encapsulant 400 in order to atmospherically seal the thyristor 302 from potentially degrading atmospheric conditions, such as moisture. Preferably, an epoxy encapsulant is used in sufficient quantity to totally encapsulate the thyristor 302 and the bond wire 304 from the outer surface of the tube 200. The circuit element may also include an insulated filling within the inner hollow portion 214 of the tube 200 around the fuse element 402 in order to suppress arcing energy occurring when the fuse element opens the circuit due to an overcurrent condition. The insulative filling can be comprised of a material such as sand, for example. It is noted that the fuse element 402 may be constructed according to any configuration known in the art. Specific constructions may include a spiral wire wound around a cylindrical core, a straight wire fuse or a metal link fuse.

Figure 5:
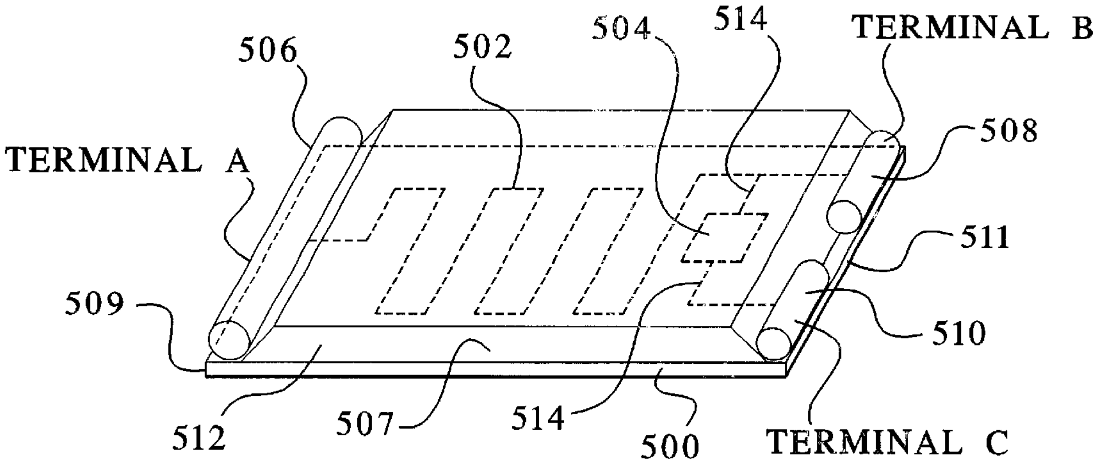
FIG. 5 illustrates a further integral overcurrent and overvoltage protection device according to an alternate embodiment of the present invention.

FIG. 5 illustrates an alternative embodiment of the present invention having a low profile that is advantageous for mounting to a printed circuit board. The circuit element according to this embodiment includes a planar substrate 500 that is used for mounting the fuse and bidirectional thyristor elements thereon. Preferably, a fuse element 502 is bonded to a surface (i.e., surface 507 of FIG. 5) of the substrate 500 and electrically connected between a terminal 506 located adjacent to an edge (i.e., edge 509 of FIG. 5) of the substrate 500 and a terminal 508 located adjacent another edge (i.e., edge 511 of FIG. 5) of the substrate 500. Although FIG. 5 illustrates the fuse element and terminals disposed on a single side of the substrate 500, other embodiments can include fuse elements on both sides the substrate 500 and also terminals disposed on either side of the substrate 500 and on any portion thereof, not just adjacent to an edge.

Additionally, a bi-directional thyristor 504 is disposed on a surface (i.e., surface 507 of FIG. 5) of the substrate 500. Metalized terminals 514 connect the anode and cathode terminals of the thyristor 504 to terminals 508 and 510 corresponding to terminals B and C of the circuit of FIG. 1.

In a preferred embodiment, the fuse element 502 and bidirectional thyristor 504 are disposed on the same surface of the substrate 500, as are terminals 506, 508 and 510. Additionally, the fuse element 500 and bidirectional thyristor 504 are encapsulated within a encapsulant 512 to protect these elements from atmospheric conditions and also to contain energy dissipated by these elements during either overcurrent or overvoltage conditions. Furthermore, the substrate 500 is constructed of a thermally conductive material in order to draw heat away from components 502 and 504.

Preferably, for both disclosed embodiments, the thermal coefficients (PCE) of the substrate 500 and the thyristor are substantially the same.

The common packaging of the overcurrent protective fuse element and the overvoltage protective thyristor element of the present invention provides the assurance that these components are properly coordinated and matched. For example, given a telecommunication circuit requiring protection of overvoltages of 600 volts or greater and short circuit conditions of 40 amps or greater, the thyristor and fuse elements can be selected accordingly and incorporated into a common package. Thus, for specific telecommunications circuits, the common circuit element of the present invention is constructed such that the thyristor and fuse elements meet regulatory and safety requirements for particular circuits without the need to ensure that both components are properly coordinated and matched as required in the prior art discrete component approach.

Additionally, by incorporating the fuse element and thyristor in a common package, the additional space requirements for two discrete component packages is eliminated, thereby reducing the physical space needed in a telecommunication circuit for overvoltage and overcurrent circuit protection. Moreover, an integrated overvoltage and overcurrent circuit element avoids problems associated with separately sourcing components and interconnecting those components made by different suppliers. This approach further reduces the cost of the final product since a single manufacturer supplies a singular overvoltage and overcurrent circuit protection element.

It should be understood that various changes and modifications to the presently preferred embodiments described herein will be apparent to those skilled in the art. Such changes and modifications can be made without departing from the spirit and scope of the present invention and without diminishing its attended advantages. It is therefore intended that such changes and modifications be covered by the appended claims.

What is claimed is:

1. An integral circuit protection device providing overcurrent and overvoltage protection for a circuit and configured to be connected to the circuit comprising:

a housing;

an overcurrent protection portion disposed within the housing;

an overvoltage protection portion coupled to an outer surface of the housing; and a plurality of terminals for connecting both the overvoltage and overcurrent protection portions of the integral circuit device to be protected.

2. The integral circuit device of claim 1, wherein the plurality of terminals includes first, second and third terminals; and the overcurrent protection portion is electrically connected between the first and second terminals and the overvoltage protection portion is connected between the second and third terminals.

3. The integral circuit device of claim 1, wherein the overcurrent protection portion includes a fuse.

4. The integral circuit device of claim 1, wherein the overvoltage protection portion includes a bi-directional thyristor.

5. The integral circuit device of claim 1, wherein the plurality of terminals of the integral circuit are configured to electrically connect the overcurrent protection portion in series with the circuit to be protected and to electrically connect the overvoltage protection portion in parallel with the circuit to be protected when the integral circuit device is electrically connected to the circuit to be protected.

6. The integral circuit device of claim 1 further comprising:

a thermally conductive portion that conducts heat away from the overvoltage protection portion.

7. The integral circuit device of claim 6, wherein thermal coefficients of the thermally conductive portion and overvoltage protection portion are substantially the same.

8. The integral circuit device of claim 1, wherein the overvoltage protection portion is at least partially encapsulated with an atmospherically resistant material.

9. The integral circuit device of claim 1, wherein the integral circuit device is configured for mounting on a printed circuit board.

10. The integral circuit device of claim 9 wherein the integral circuit device is configured substantially the same as a standard telecommunications fuse configuration.

11. A circuit element for overvoltage and overcurrent protection of a circuit comprising:

a circuit element housing having first, second and third terminals;

an overcurrent protection device electrically connected between the first and second terminals, the overcurrent device contained by the circuit element housing; and an overvoltage protection device electrically connected between the second and third terminals and also disposed on an outer surface of the housing, and wherein at least one of the terminals electrically connects with the overvoltage protection device outside the housing.

12. The circuit element according of claim 11, wherein the circuit element housing is further comprised of a tube having an outer surface, an inner hollow portion, a first end and a second end;

wherein the overcurrent protection device is disposed within the inner hollow portion of the tube, the overvoltage protection device and the second terminal are disposed on the outer surface of the tube, the first terminal is disposed at the first end and the second terminal is disposed at the second end opposite from the first terminal.

13. The circuit element of claim 12, wherein the first and second terminals include electrically conductive layers disposed on the outer surface of the tube adjacent to each of the first and second ends and extending into part of the inner hollow portion adjacent to the first and second ends; and conductive end caps respectively covering the electrically conductive layers and the first and second ends and electrically connected to the electrically conductive layers;

wherein the electrically conductive layers are electrically connected to the overcurrent device disposed within the inner hollow portion of the tube.

14. The circuit element of claim 13, wherein the third terminal is comprised of a conductive terminal disposed on the outer surface of the tube.

15. The circuit element of claim 14, further comprising:

a die bond pad disposed on the outer surface of the tube;

a bond pad conductor disposed on the outer surface of the tube and electrically connected to at least one of the first and second conductive layers;

a first conductor electrically connecting the bond pad conductor to the die bond pad and a second conductor electrically connecting the third terminal to the die bond pad; and wherein the overvoltage protection device includes a thyristor disposed on the die bond pad and covered with an encapsulant material.

16. The circuit element of claim 15, wherein the encapsulant material is atmospherically resistant and disposed such that the thyristor and the die bond pad on the outer surface of the tube are sealed to resist surrounding atmosphere.

17. The circuit element of claim 16, wherein the encapsulant material is comprised of an epoxy.

18. The circuit element of claim 15, wherein the thyristor disposed on the die bond pad is bonded to the die bond pad by a thermally conductive bonding material.

19. The circuit element of claim 18, wherein the thermally conductive bonding material is comprised of at least one of solder and epoxy.

20. The circuit element of claim 12, wherein the circuit element is connected in a telecommunication system and located between a supplying twisted pair of wires and the circuit being protected.

21. The circuit element of claim 12, wherein the tube has a cross-sectional shape that is approximately square.

22. The circuit element of claim 11, wherein the overcurrent device is a fuse configured to protect the circuit from excessive currents.

23. The circuit element of claim 11, wherein the overvoltage device is a thyristor configured to protect the circuit from excessive voltages.

24. The circuit element of claim 11, wherein the overcurrent device is electrically connected in series with the circuit to be protected and the overvoltage device is electrically connected in parallel with the circuit to be protected.

25. The circuit element of claim 11, wherein the circuit element housing further comprises:

a substrate having first and second surfaces; and a plurality of wire terminations disposed on at least one of the first and second surfaces, wherein the first, second and third terminals are each respectively comprised of one of the plurality of wire terminations.

26. The circuit element of claim 25, wherein the overcurrent device is comprised of a fuse element electrically connected between the first and second terminals and disposed on at least one side of the substrate; and the overvoltage device is comprised of a thyristor electrically connected between the second and third terminal and disposed on at least one side of the substrate.

27. The circuit element of claim 20, further comprising:

an atmospherically resistant encapsulant disposed on at least one side of the substrate and having the fuse element and thyristor therebetween.

28. The circuit element of claim 27, wherein the fuse element and thyristor are disposed on the same side of the substrate.

29. The circuit element of claim 27, wherein the encapsulant is comprised of an epoxy.

30. The circuit element of claim 25, wherein the substrate has two opposing edges and at least one of the plurality of wire terminals is disposed near one of the opposing edges and at least one other of the plurality of wire terminals is disposed near the other of the opposing edges.

31. The circuit element of claim 11, wherein the housing is comprised of a thermally conductive material.

32. The circuit element of claim 31, wherein the thermally conductive material is a ceramic.

33. The circuit element of claim 31, wherein the overvoltage device and the housing have substantially the same thermal coefficient.

* * * * *

UNITED STATES PATENT AND TRADEMARK OFFICE

CERTIFICATE OF CORRECTION

PATENT NO. : 6,510,032 B1
APPLICATION NO. : 09/534277
DATED : January 21, 2003
INVENTOR(S) : Stephen J. Whitney It is certified that error appears in the above-identified patent and that said Letters Patent is hereby corrected as shown below:

In Claim 1, column 8, line 6, change "a plurality of terminals for connecting both the overvoltage and overcurrent protection portions of the integral circuit device to be protected." to --a plurality of terminals for connecting both the overvoltage and overcurrent protection portions of the integral circuit device to the circuit to be protected.--.

Signed and Sealed this

Twenty-sixth Day of June, 2007

JON W. DUDAS
*Director of the United States Patent and Trademark Office*